United States Patent
Crasso et al.

(10) Patent No.: US 10,621,871 B2
(45) Date of Patent: *Apr. 14, 2020

(54) VEHICLE AND BICYCLE COMMUNICATION TO AVOID VEHICLE DOOR CRASH ACCIDENTS

(71) Applicant: INTERNATIONAL BUSINESS MACHINES CORPORATION, Armonk, NY (US)

(72) Inventors: Marco P. Crasso, Mar del Plata (AR); Jeronimo Irazabal, Roque Perez (AR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/386,388

(22) Filed: Apr. 17, 2019

(65) Prior Publication Data
US 2019/0251844 A1  Aug. 15, 2019

Related U.S. Application Data

(63) Continuation of application No. 15/892,878, filed on Feb. 9, 2018, now Pat. No. 10,304,341.

(51) Int. Cl.
*G08G 1/16* (2006.01)
*H04W 4/46* (2018.01)
(Continued)

(52) U.S. Cl.
CPC .............. *G08G 1/166* (2013.01); *H04W 4/46* (2018.02); *H04W 4/38* (2018.02); *H04W 4/40* (2018.02);
(Continued)

(58) Field of Classification Search
None
See application file for complete search history.

(56) References Cited

U.S. PATENT DOCUMENTS 6,203,060 B1  3/2001  Cech
8,963,701 B2  2/2015  Rodriguez
(Continued)

FOREIGN PATENT DOCUMENTS

CN  105083113 A  11/2015
GB  2555697 A  5/2018

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Steven Lim
*Assistant Examiner* — Muhammad Adnan
(74) *Attorney, Agent, or Firm* — Samuel A. Waldbaum

(57) ABSTRACT

A method, computer system, and a computer program product for communicating between a bicycle and a vehicle to prevent vehicle open door accidents is provided. The present invention may include collecting data from a bicycle device associated with the bicycle. The present invention may also include determining the vehicle is involved in at least one high-risk activity. The present invention may then include determining the bicycle is in a proximity of the vehicle involved in the at least one high-risk activity. The present invention may further include transmitting, by the bicycle device, a plurality of proximity alerts to the vehicle involved in the at least one high-risk activity.

20 Claims, 9 Drawing Sheets

(51) Int. Cl.
*H04W 4/40* (2018.01)
*H04W 4/42* (2018.01)
*H04W 4/38* (2018.01)
*H04W 4/44* (2018.01)
*H04W 4/80* (2018.01)

(52) U.S. Cl.
CPC ............. *H04W 4/42* (2018.02); *H04W 4/44* (2018.02); *H04W 4/80* (2018.02)

(56) References Cited

U.S. PATENT DOCUMENTS

| | | | | |
|---|---|---|---|---|
| 9,491,788 | B1* | 11/2016 | Kasai | G06K 7/1417 |
| 9,797,178 | B2* | 10/2017 | Elie | E05F 15/42 |
| 9,815,363 | B2* | 11/2017 | Biderman | B60L 15/20 |
| 9,848,289 | B2* | 12/2017 | Fischer | H04W 64/006 |
| 9,852,599 | B1* | 12/2017 | Slavin | H04W 4/90 |
| 10,040,509 | B1* | 8/2018 | Lee | B62M 6/45 |
| 10,062,290 | B2* | 8/2018 | Dry | H04L 67/00 |
| 10,069,919 | B2* | 9/2018 | Yu | H04W 4/029 |
| 10,091,760 | B2* | 10/2018 | Lee | H04W 12/08 |
| 10,098,175 | B2* | 10/2018 | Kremo | H04W 76/25 |
| 10,304,341 | B1* | 5/2019 | Crasso | H04W 4/46 |
| 2007/0085666 | A1 | 4/2007 | Lahr | |
| 2009/0033474 | A1* | 2/2009 | Chen | B60Q 1/323 |
| | | | | 340/425.5 |
| 2011/0260848 | A1* | 10/2011 | Rodriguez Barros | B60Q 1/2665 |
| | | | | 340/438 |
| 2011/0298605 | A1* | 12/2011 | Lu | B60Q 1/2665 |
| | | | | 340/438 |
| 2012/0065858 | A1* | 3/2012 | Nickolaou | B60Q 9/008 |
| | | | | 701/70 |
| 2012/0194356 | A1* | 8/2012 | Haines | G08G 1/161 |
| | | | | 340/933 |
| 2013/0127638 | A1* | 5/2013 | Harrison | G08G 1/166 |
| | | | | 340/903 |
| 2014/0118130 | A1* | 5/2014 | Chang | G08G 1/163 |
| | | | | 340/435 |
| 2014/0244150 | A1* | 8/2014 | Boesch | G01S 19/42 |
| | | | | 701/123 |
| 2014/0297173 | A1* | 10/2014 | Li | G08G 1/056 |
| | | | | 701/301 |
| 2014/0335897 | A1* | 11/2014 | Clem | G08G 1/0112 |
| | | | | 455/456.3 |
| 2015/0042491 | A1* | 2/2015 | Burnison | B60Q 1/52 |
| | | | | 340/902 |
| 2015/0166062 | A1* | 6/2015 | Johnson | B60W 30/12 |
| | | | | 701/41 |
| 2015/0228066 | A1* | 8/2015 | Farb | G06K 9/00805 |
| | | | | 348/148 |
| 2015/0251599 | A1* | 9/2015 | Koravadi | B60Q 9/008 |
| | | | | 340/903 |
| 2015/0312404 | A1* | 10/2015 | Abramson | H04W 4/027 |
| | | | | 455/418 |
| 2016/0027299 | A1* | 1/2016 | Raamot | G08G 1/08 |
| | | | | 340/917 |
| 2016/0061625 | A1* | 3/2016 | Wang | G01C 21/3697 |
| | | | | 701/454 |
| 2016/0073722 | A1* | 3/2016 | Eustace | A42B 3/0466 |
| | | | | 340/539.13 |
| 2016/0104380 | A1* | 4/2016 | Maiolani | G08G 1/166 |
| | | | | 340/432 |
| 2017/0072851 | A1* | 3/2017 | Shenoy | B60Q 9/008 |
| 2017/0162053 | A1 | 6/2017 | Margalef | |
| 2017/0218678 | A1* | 8/2017 | Kothari | E05F 15/73 |
| 2017/0232967 | A1* | 8/2017 | Tomatsu | B60W 30/18009 |
| | | | | 701/117 |
| 2017/0292848 | A1* | 10/2017 | Nepomuceno | G01C 21/3492 |
| 2018/0018840 | A1 | 1/2018 | Xia et al. | |
| 2018/0075721 | A1* | 3/2018 | Oliver | H04W 4/70 |
| 2018/0075747 | A1* | 3/2018 | Pahwa | B60W 40/09 |
| 2018/0178800 | A1* | 6/2018 | Ishii | G08G 1/09623 |
| 2018/0181139 | A1* | 6/2018 | Ishii | G08G 1/166 |
| 2018/0181824 | A1* | 6/2018 | Ishii | G08G 1/0112 |
| 2018/0350240 | A1* | 12/2018 | Sivashankar | G08G 1/164 |
| 2019/0143967 | A1* | 5/2019 | Kutila | G08G 1/162 |
| 2019/0272747 | A1* | 9/2019 | Raamot | G08G 1/0129 |

OTHER PUBLICATIONS

Cui et al., "Experimental Characterization of Traffic Light to Vehicle VLC Link Performance," 2nd IEEE Workshop on Optical Wireless Communications, 2011, p. 808-812, IEEE.

Kato et al., "iPvlc: Pixel-level Visible Light Communication for Smart Mobile Devices," SIGGRAPH 2011, Aug. 7-11, 2011, 1 Page, Vancouver, British Columbia, Canada.

Lewin, "LEDs Bring New Light to Car-to-Car Communication," IEEE Spectrum, Aug. 20, 2014, p. 1-3, https://spectrum.ieee.org/transportation/advanced-cars/leds-bring-new-light-to-car-to-car-communication, Accessed on Feb. 6, 2018.

IBM: List of IBM Patents or Patent Applications Treated As Related (Appendix P), Jul. 12, 2019, pp. 1-2.

* cited by examiner

VEHICLE AND BICYCLE COMMUNICATION TO AVOID VEHICLE DOOR CRASH ACCIDENTS

BACKGROUND

The present invention relates generally to the field of computing, and more particularly to electronically implemented vehicle and bicycle safety measures.

Since the early 19th century, bicycles have been utilized by humans as a form of transportation. However, there has been a recent surge of people utilizing bicycles as an alternative to motorized vehicles. With an increase in bicyclists on the road, there has been an increased demand for more bicycle safety research, when sharing roadways with motorized vehicles.

SUMMARY

Embodiments of the present invention disclose a method, computer system, and a computer program product for communicating between a bicycle and a vehicle to prevent vehicle open door accidents. A method, computer system, and a computer program product for communicating between a bicycle and a vehicle to prevent vehicle open door accidents is provided. The present invention may include collecting data from a bicycle device associated with the bicycle, wherein collecting the data comprises: determining, by the bicycle device, the bicycle is in a stationary state; sending, by the bicycle device, a request to a user to confirm that the bicycle is in the stationary state; and receiving, from the user, a response to the sent request, wherein the user confirms that the bicycle is in an active state. The present invention may also include determining the vehicle is involved in at least one high-risk activity. The present invention may then include determining the bicycle is in a proximity of the vehicle involved in the at least one high-risk activity. The present invention may further include transmitting, by the bicycle device, a plurality of proximity alerts to the vehicle involved in the at least one high-risk activity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
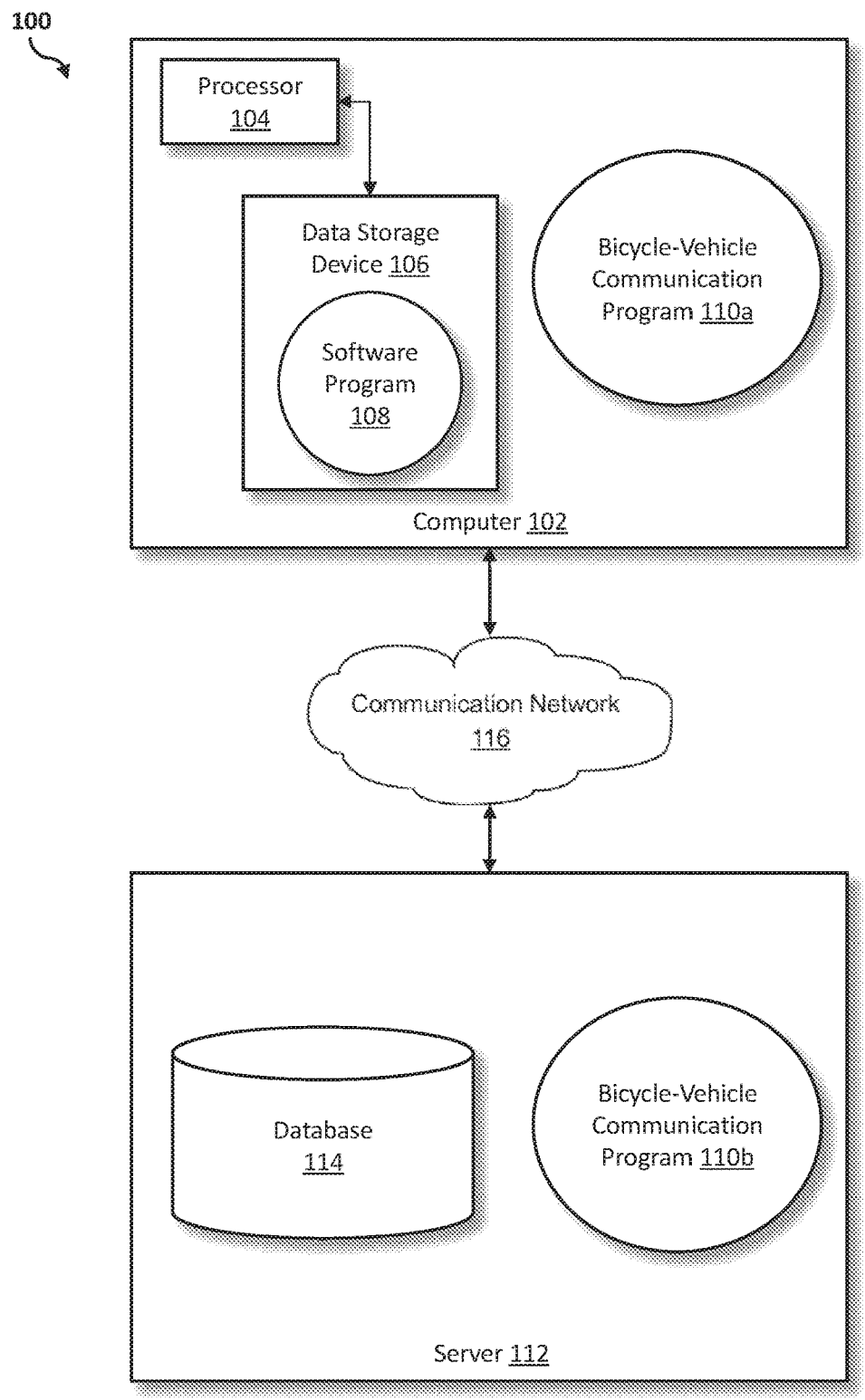
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for communicating between bicycles and vehicles to avoid open vehicle door accidents. As such, the present embodiment has the capacity to improve the technical field of bicycle and vehicle safety by utilizing communication between bicycles and vehicles to avoid open vehicle door accidents. More specifically, the bicycle-vehicle communication program may be notified of an event (e.g., vehicle parked or vehicle door being opened). The vehicle device of the bicycle-vehicle communication program may then emit a signal to bicycles in close proximity and direct path of the vehicle. The bicycle device of the bicycle-vehicle communication program may then receive the signal from the vehicle device, while continuously sending proximity alerts to parked vehicles. The proximity alert emitted by the bicycle device may then trigger at least one preventative action within the vehicle (e.g., turning on an internal alert light, playing a sound, or momentarily blocking the doors of the vehicle that are located at the side of the mirror that received the proximity alert) to prevent an open vehicle door accident.

As described previously, since the early 19th century, bicycles have been utilized by humans as a form of transportation. However, there has been a recent surge of people utilizing bicycles as an alternative to motorized vehicles. With an increase in bicyclists on the road, there has been an increased demand for more bicycle safety research, when sharing roadways with motorized vehicles.

Open vehicle door accidents account for a vast amount of bicycle accidents involving vehicles, especially in cities with traffic problems, where bicycles may resolve vehicle congestion.

Therefore, it may be advantageous to, among other things, utilize bicycle and vehicle communication to avoid open vehicle door accidents involving bicycles.

According to at least one embodiment, the bicycle-vehicle communication program may utilize two devices: vehicle device and bicycle device. A vehicle device may receive proximity alerts from bicycles and may emit a signal (i.e., alert signal) to alert bicycles that the vehicle has been recently parked (i.e., door opening is a strong probability), or that a vehicle door is being opened or is opened. A bicycle device may receive signals from a vehicle, while continuously sending proximity alerts to parked vehicles. Both the vehicle and bicycle devices may act as a receptor and transmitter using visible light communication (VLC), or other communication protocol (e.g., Wi-Fi).

According to at least one embodiment, the bicycle-vehicle communication program may include a vehicle device integrated into vehicle sensors. The vehicle device may be interconnected to the main sensor system of the vehicle to receive and/or send an electric signal when the vehicle is parked and the door of the vehicle is being opened. The vehicle device may send the electric signal (e.g., proximity alert) to the main system of the vehicle (e.g., on-board vehicle computer) when the main system of the vehicle receives the signal from a bicycle device. Such a response may trigger specific actions inside of the vehicle (e.g., turning on an internal alert light, playing a sound, or momentarily blocking the doors of the vehicle that are located at the side of the mirror that received the proximity alert).

According to at least one embodiment, the bicycle-vehicle communication program may not include a limit on the specific preventative actions inside of the vehicle that may be triggered by the proximity alert of the bicycle device. Instead, the preventative actions may be based on the design alternatives implemented by the manufacturers and designers of the vehicle.

According to at least one embodiment, the bicycle-vehicle communication program may simultaneously receive multiple alerts. As such, the bicycle-vehicle communication program may utilize a timestamp to indicate the times that the multiple alerts were received by the vehicle device.

According to at least one embodiment, the bicycle device may be in a continuous transmission state thereby sending proximity alerts to parked vehicles. In addition, the reception state may be enabled, and once the bicycle device receives an alert from a vehicle event, the bicycle may notify the bicyclist (e.g., play a sound on the speaker). Different notifications may be utilized for different events (e.g., different sounds may be used for a recently parked vehicle event, or an open vehicle door event).

According to at least one embodiment, the bicycle-vehicle communication program may utilize a more complex bicycle device. The complex bicycle device may send a software signal to a smart plane, when the complex bicycle device receives a vehicle parked alert, and open vehicle door alert. The owner of the complex bicycle device and smart phone may configure triggers related to the mentioned software events (e.g., ring tone, flash, prepare a recorded call to 911 with current location), which may be activated and sent by the bicyclist or other person who may assist during a crash.

According to at least one embodiment, the bicycle and vehicle devices may be constructed with VLC to detect more signals than the human eye. VLC may serve as transmitters to camera receivers in daylight and dark conditions. VLC (i.e., LEDs and lasers may be used as transmission sources for VLC) may include the use of LED devices for communication and illumination to be performed using a single device. The VLC receiver may include an amplification circuit, optical filter and optical concentrator.

According to at least one embodiment, the vehicle device associated with the bicycle-vehicle communication program may include multiple LEDs and at least one side mirror as transmitters, which may send a warning signal when the vehicle is parked and another signal while a door is being opened. Additionally, the bicycle device associated with the bicycle-vehicle communication program may include multiple rear cameras and at least one camera on each of the mirrors for better orientation.

The present embodiment may include vehicle to vehicle communication in which a parked vehicle may send an alert to vehicles parked behind the parked vehicle. The alert may advise the other parked vehicles that a bicyclist is approaching regardless of whether the bicyclist may send the signal to that vehicle.

According to at least one embodiment, the probability of a door being opened may be automatically adjusted and provided by a service, based on multiple variables (e.g., parked timing, vehicle, location, and date and time). In the present embodiment, different actions may be triggered based on the obtained probability. As for location and distance, the bicycle-vehicle communication program may, for example, be triggered when the bicycle is in the direct path of the parked vehicle.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a bicycle-vehicle communication program 110a. The networked computer environment 100 may also include a server 112 that is enabled to run a bicycle-vehicle communication program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the bicycle-vehicle communication program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the bicycle-vehicle communication program 110a, 110b (respectively) to communicate between a bicycle and vehicle, and alert bicyclists and vehicle occupants to avoid open vehicle door accidents. The bicycle-vehicle communication method is explained in more detail below with respect to FIGS. 2A, 2B, 3A, 3B, 4A and 4B.

Figure 2A:
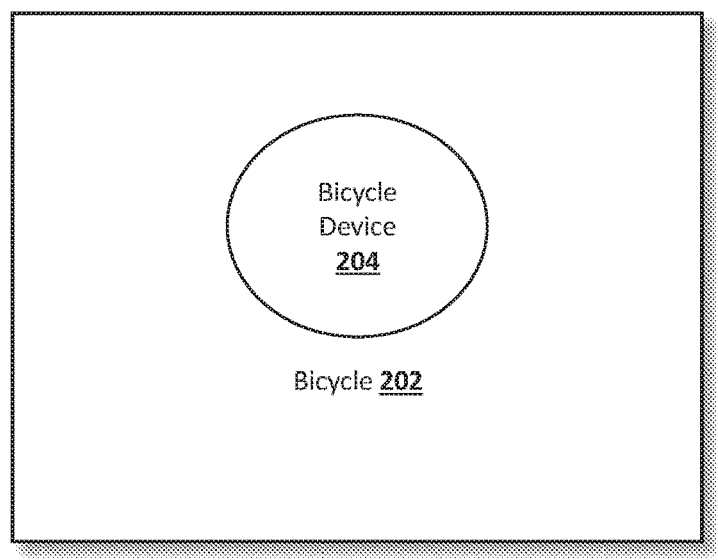
FIG. 2A illustrates a bicycle device environment according to at least one embodiment.

Referring now to FIG. 2A, an exemplary bicycle device environment 200 in accordance with one embodiment is depicted. As shown, the bicycle device environment 200 comprises a bicycle 202. The bicycle device 204 may be placed on a stem or stent of the bicycle 202 and may be easily detached to allow bicyclists to remove the bicycle device 204 and take the bicycle device 204 with the bicyclist when parking the bicycle 202 in public places. The bicycle device 204 may include a waterproof battery-powered device with a solar or dynamo source, one Light Emitting Diode (LED) based transmitter, one camera receptor, one speaker, and a port for earphones.

In the present embodiment, the bicycle device 204 may be affixed to the helmet of the bicyclist. Since helmet use is mandatory in many jurisdictions, the bicyclist may attach the bicycle device 204 to the helmet. Therefore, the bicyclist may not have to detach the bicycle device 204 from the bicycle when parking the bicycle 202 in public places.

Figure 2B:
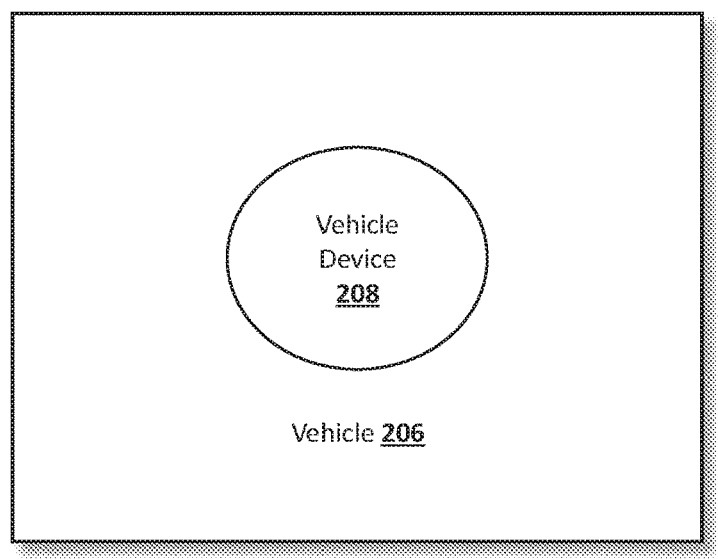
FIG. 2B illustrates a vehicle device environment according to at least one embodiment.

Referring now to FIG. 2B, an exemplary vehicle device environment 200 in accordance with one embodiment is depicted. As shown, the vehicle device environment 200 comprises a vehicle 206. The vehicle device 208 may be placed inside the vehicle 206. The specific location of the vehicle device 208 within the vehicle 206 may depend on the specific manufacturer of the vehicle 206 associated with the vehicle device 208.

Figure 3A:
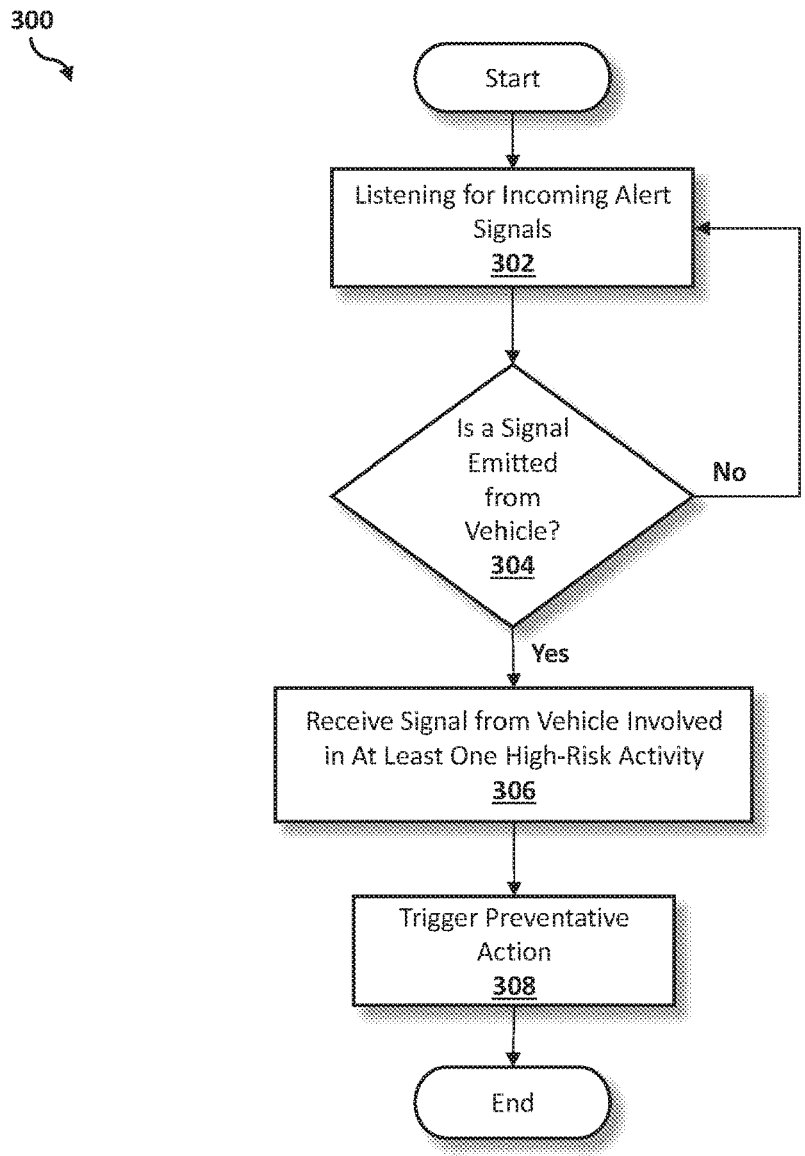
FIG. 3A is an operational flowchart illustrating a process for bicycle initiated safety communication for at least one vehicle involved in at least one high-risk activity according to at least one embodiment.

Referring now to FIG. 3A, an operational flowchart illustrating the exemplary bicycle initiated safety communication process for at least one vehicle involved in at least one high-risk activity 300 used by the bicycle-vehicle communication program 110a and 110b according to at least one embodiment is depicted.

At 302, a bicycle device 204 listens for incoming alert signals. Using a software program 108 on the user's device (e.g., user's computer 102), the notifications from a vehicle device 208 that is related to a vehicle 206 involved in at least one high-risk activity (e.g., parking a vehicle 206 or opening at least one door) may be transmitted as input into a bicycle device 204 associated with the bicycle-vehicle communication program 110a, 110b via a communication network 116. The bicycle device 204 associated with the bicycle-vehicle communication program 110a, 110b may be continuously listening for such incoming alert signals (i.e., incoming notifications).

For example, at 7:30 am on a weekday, Bicycle A is riding down Sixth Avenue, a busy commercial avenue located in the Fashion District of New York City. The bicycle-vehicle communication program 110a, 110b is run by a bicycle device 204 associated with Bicycle A (i.e., Bicycle Device A) attached to the bicycle stem. Bicycle Device A is waterproof and solar powered, and includes a LED-based transmitter, camera receptor, one speaker and a port for earphones. The bicycle-vehicle communication program 110a, 110b determines that the bicyclist riding Bicycle A (i.e., Bicyclist A) is heading to work located approximately three miles away in the Flatiron District of New York City. As such, the bicycle-vehicle communication program 110a, 110b determines the direct path of Bicycle A, and while Bicycle Device A remains on Bicycle A and Bicycle A remains in motion, since the kickstand is not in the down position, Bicycle Device A continues to listen for any incoming notifications that a vehicle 206 in the direct path of Bicycle A has recently parked or has an open door.

In the present embodiment, the bicycle device 204 may stop listening for incoming notifications when the bicycle device 204 is removed from the bicycle stem or any part associated with the bicycle 202, a certain time-period has lapsed since the helmet with the bicycle device 204 was in close proximity to the bicycle 202, the bicycle 202 is not in motion, which may be indicated by the kickstand being placed in the down position or by a lack of movement on a Global Positioning System tracking device (i.e., GPS tracking device) associated with the bicycle 202, or a certain time-period has lapsed since the bicycle 202 was in motion. Additionally, in the present embodiment, the bicycle-vehicle communication program 110a, 110b may confirm that the bicycle 202 is no longer in motion (i.e., stationary state) by making an auditory sound and asking the bicyclist to affirmatively indicate that the bicycle 202 is in motion (e.g., move the pedals to indicate that the bicycle 202 is still in motion). If a certain time period has lapsed without the bicyclist affirmatively indicating that the bicycle 202 is in motion, then the bicycle device 204 may automatically go into sleep mode.

In the present embodiment, the bicycle device 204 may automatically determine the direct path of the bicycle 202 based on the time and date in which the bicycle 202 is in motion, and the location of the bicycle 202 by utilizing a GPS tracking device associated with the bicycle 202, the cameras associated with the bicycle 202, or historical route data in the database 114. For example, if the bicycle 202 is leaving the home of the bicyclist at 8:00 am on a weekday and starts traveling in the direction of the bicyclist's place of employment, then, based on the time and the direction that the bicycle 202 is travelling as indicated by a camera or GPS tracking device associated with the bicycle 202, the bicycle-vehicle communication program 110a, 110b may determine that the bicyclist is heading to work and the direct path may be any routes that may lead to the bicyclist's place of employment.

In the present embodiment, the bicycle-vehicle communication program 110a, 110b may learn the patterns of the bicyclists by sharing historical route data in the database 114, and if the bicyclist travels to a certain place at specific time or day, or takes a specific route to a specific destination, then the bicycle-vehicle communication program 110a, 110b may utilize this data to determine the direct path of the bicyclist.

In the present embodiment, the bicyclist may synchronize a smart phone or other electronic device to the bicycle-vehicle communication program 110a, 110b. As such, if the bicyclist utilizes the smart phone or other electronic device to find a location or place, or activates a navigation application on that electronic device or smart phone within close proximity of start of the bicycle trip, then the bicycle-vehicle communication program 110a, 110b may set the destination based the data generated on the smart phone or electronic device.

In the present embodiment, the bicycle-vehicle communication program 110a, 110b may notify the bicyclist of any parked vehicles or vehicles with an open door located on the side on which the bicycle 202 is travelling by utilizing a GPS tracking device or cameras associated with the bicycle 202. For example, if the bicycle 202 is travelling on right side of the road, then the bicycle-vehicle communication program 110a, 110b may notify the bicyclist of vehicles located on the right side of the road. If, however, the bicyclist moves to the left side of the road, then the bicycle-vehicle communication program 110a, 110b may change and start to immediately notify the bicyclist of applicable vehicles located on the left side of the road.

In the present embodiment, the bicycle-vehicle communication program 110a, 110b may assume that the bicyclist abides by all traffic laws and regulations under the local and state laws and codes that apply to a bicycle 202. As such, the direct path generated by the bicycle-vehicle communication program 110a, 110b may be paths or routes that are in accordance to all traffic laws and regulations applicable to a bicycle 202.

At 304, the bicycle-vehicle communication program 110a, 110b determines if a signal is emitted from a vehicle. The signal is emitted from a vehicle 206 involved in at least one high-risk activity, and the signal (i.e., alert signal) is intended to caution the bicyclist that at least one vehicle, in the direct path of the bicycle 202, is parked, or has or will have at least one open door.

If the bicycle-vehicle communication program 110a, 110b determines that there is no signal emitted from a vehicle 206 at 304, then the bicycle-vehicle communication program 110a, 110b may continue to listen for incoming notifications at 302. Until the bicycle device 204 associated with the bicycle-vehicle communication program 110a, 110b receives an incoming notification, the bicycle device 204 may continuously listen for such incoming notifications.

Continuing the previous example, the bicycle-vehicle communication program 110a, 110b determines that no parked vehicles or vehicles with an open door are located in the direct path of Bicycle A. As such, since Bicycle A remains in motion, Bicycle Device A continues to listen for notifications that at least one vehicle 206 has recently parked or at least one vehicle 206 has at least one open door.

If, however, the bicycle-vehicle communication program 110a, 110b determines that there is at least one signal emitted from a vehicle 206 at 304, then the bicycle device 204 associated with the bicycle-vehicle communication program 110a, 110b may receive the signal from at least one vehicle 206 involved in a high-risk activity (i.e., at least one parked vehicle 206 or vehicle 206 with an open door) at 306. The bicycle-vehicle communication program 110a, 110b may then notify the bicyclist via audio, visual or other means (e.g., loud noise, vibrating the handle bar) that at least one vehicle 206 involved in a high-risk activity is in the direct path of the bicyclist, before such vehicle 206 may be within the view of the bicyclist.

Continuing the previous example, if the bicycle-vehicle communication program 110a, 110b determines that approximately 70 meters down Sixth Avenue in the direct path of Bicyclist A, Vehicle Z, a taxi cab, parked less than one minute ago and has emitted a signal that the vehicle 206 has recently parked and no doors have opened yet, then the bicycle-vehicle communication program 110a, 110b transmits that signal to Bicyclist A. The grip bar attached to Bicycle A then vibrates via force feedback control to notify Bicyclist A that a parked vehicle 206 is ahead. The bicycle-vehicle communication program 110a, 110b then utilizes an automated voice to state that a parked vehicle 206 is located approximately 70 meters on the right side of Bicycle A, and Bicyclist A hears the automated voice via the earphones affixed to the ears of Bicyclist A and connected to Bicycle Device A at the time of the announcement.

In the present embodiment, the bicycle-vehicle communication program 110a, 110b may connect the bicycle device 204 to a computer display monitor (if not already connected) while the bicycle-vehicle communication program 110a, 110b is not in use. A screen may appear in which, for example, a "Settings" button is located on the bottom right side. Once the user (i.e., bicyclist) clicks on the "Settings" button, the bicyclist may be prompted (e.g., via dialog box) whether the bicyclist intends to change the settings with "Yes" and "No" buttons at the bottom of the dialog box. If the bicyclist clicks the "Yes" button, then the dialog box may expand for the bicyclist to change the settings (e.g., visual or audio means of notification and notifications on how far away the vehicle 206 is based on certain distance or time frame) for how the bicycle-vehicle communication program 110a, 110b may notify the bicyclist. Additionally, the bicyclist may set the specific measurement system for the distance (e.g., metric system, imperial system and United States customary units), and the specific units for measuring time (e.g., seconds, minutes). To determine the amount of time it may take for a bicycle 202 to arrive at the vehicle, the bicycle-vehicle communication program 110a, 110b may calculate the bicyclist's average rate of speed. If, however, the bicyclist clicks the "No" button, then the dialog box may not expand and the dialog box may disappear.

Then, at 308, the bicycle-vehicle communication program 110a, 110b triggers a preventative action. Once the bicycle-vehicle communication program 110a, 110b confirms that a bicycle device 204 is approaching the vehicle device 208, then the bicycle-vehicle communication program 110a, 110b may trigger at least one preventative action at vehicle device 208 (e.g., turning on an alert internal light, playing a loud noise, or momentarily blocking the doors located at the side of the mirror). Such preventative action may notify the occupants of vehicle 206 that a bicycle 202 is approaching and may prevent the occupants of vehicle 206 from opening the doors without confirming that the bicycle 202 is not approaching, thereby reducing incidents related to vehicle open door accidents involving at least one bicycle 202.

Continuing the previous example, the device associated with Vehicle Z (i.e., Vehicle Device Z) blinked the internal lights of Vehicle Z. Then, Vehicle Device Z momentarily locked the four doors of Vehicle Z, when Bicycle A was approximately 15 meters away. The temporary lock was deactivated when Bicycle A passed Vehicle Z.

In the present embodiment, the bicycle-vehicle communication program 110a, 110b may utilize visible light communication to emit signals between the vehicle device 208 and bicycle device 204. Visible light communication may surpass the human eye for detecting signals in extreme dark or daylight. According to other embodiments, other communication may be used such as Wi-Fi, or communication network 116.

In the present embodiment, the preventative action triggered by the bicycle-vehicle communication program 110a, 110b may depend on the manufacturer of the vehicle 206 associated with the vehicle device 208 and the specific settings programmed by the owner or operator of the vehicle 206. The bicycle-vehicle communication program 110a, 110b may connect the vehicle device 208 to a computer display monitor (if not already connected) while the bicycle-vehicle communication program 110a, 110b is not in use. A screen may appear in which the "Settings" button is located on the bottom right side. Once the owner or operator of the vehicle 206 clicks on the "Settings" button, the owner, operator or occupant of the vehicle 206 may be prompted (e.g., via dialog box) to indicate the setting that the owner or operator of the vehicle 206 intends to change. In the list of settings, there may be a "Preventative Action" button. If the owner or operator of the vehicle 206 clicks the "Preventative Action" button, then the dialog box may expand the list of possible preventative actions (e.g., honk horn, flash lights, display warning screen, lock doors) that may be implemented by the specific vehicle 206. The owner or operator of the vehicle 206 may select the preferred preventative action. The dialog box may expand and prompt the owner or operator of the vehicle 206 to confirm the preventative action selection by clicking the "Yes" or "No" button under a statement restating the selected preventative action. Once the vehicle owner or operator clicks "Yes," the dialog box may disappear. If, however, the vehicle owner or operator selects the "No" button, then the dialog box may remain for the owner or operator of the vehicle 206 to clarify the selected preventative action.

Figure 3B:
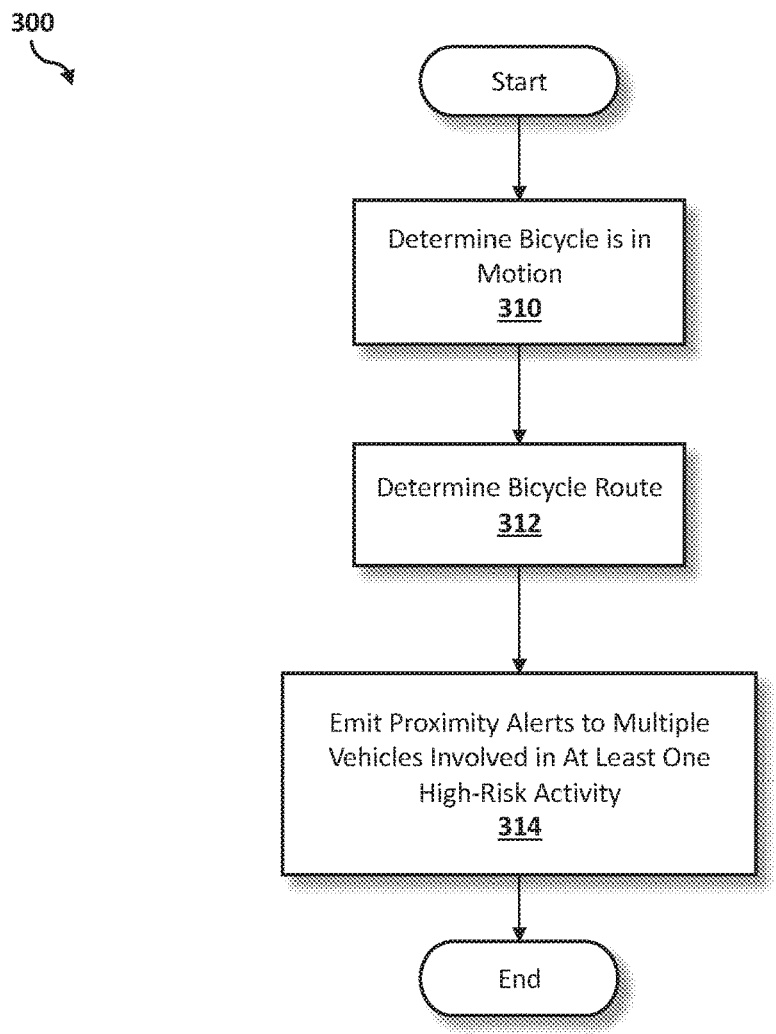
FIG. 3B is an operational flowchart illustrating a process for bicycle initiated communication to multiple vehicles involved in at least one high-risk activity according to at least one embodiment.

Referring now to FIG. 3B, an operational flowchart illustrating the exemplary bicycle initiated communication process to multiple vehicles involved in at least one high-risk activity 300 used by the bicycle-vehicle communication program 110a and 110b according to at least one embodiment is depicted.

At 310, the bicycle device 204 associated with the bicycle-vehicle communication program 110a, 110b determines that the bicycle 202 is in motion. Using a series of sensors connected to the bicycle 202 (e.g., kickstand) and the bicycle device 204, the bicycle-vehicle communication program 110a, 110b may determine that the bicycle 202 is in motion. If the kickstand is in the down position, then the sensors connected to the kickstand may notify the bicycle device 204 that the bicycle 202 is not in motion. The sensors may also inform the bicycle device 204 on the amount of time that has lapsed since the bicycle 202 was in motion. Alternatively, the bicycle device 204 may utilize a GPS tracking device, or smart phone associated with the bicycle 202 to determine that the bicycle 202 is in motion.

For example, at 12:00 pm on a Saturday afternoon, Bicycle B is traveling to a local brunch spot. Since the sensors connected to the kickstand indicate that the kickstand is in the up position, then Bicycle Device B determines that Bicycle B is in motion.

Then, at 312, the bicycle device 204 associated with the bicycle-vehicle communication program 110a, 110b determines the bicycle route. Using a GPS tracking device, shared historical route data in the database 114, or other electronic devices (e.g., smart phone) associated with the bicycle device 204, the bicycle device 204 may determine the bicycle route thereby determining the vehicles involved in at least one high-risk activity within the direct path of the bicycle 202.

Continuing the previous example, the bicyclist riding Bicycle B (i.e., Bicyclist B) is utilizing a navigation application on the smart phone for Bicyclist B, which is synchronized to Bicycle Device B, to generate directions to the restaurant. Therefore, Bicycle Device B determined the direct path of Bicycle B.

Then, at 314, the bicycle device 204 emits proximity alerts to multiple vehicles involved in at least one high-risk activity. Using a software program 108 on the user's device (e.g., user's computer 102), the bicycle device 204 may continuously transmit proximity alerts to vehicle devices 208 associated with parked vehicles via a communication network 116. The bicycle device 204 may act as a transmitter by emitting proximity alerts to multiple parked vehicles within the direct path of the bicycle 202. As such, if the vehicle 206 intends to move, has been parked for a longer period of time, or has not opened the door, the occupants of the vehicle 206 (if any) may be notified that a bicycle 202 is approaching.

Continuing the previous example, Bicycle Device B emits proximity alerts (e.g., advising that Bicycle B is approaching the parked vehicle 206 and may provide additional information on the distance and time away from the parked vehicle) to any parked vehicles, regardless of how long the vehicles were parked, within the direct path of Bicycle B.

In the present embodiment, the bicycle device 204 may transmit, via VLC, Wi-Fi, or communication network 116 approximately how far the bicycle 202 is from the specific vehicle, and the estimated time that the bicycle 202 may pass the vehicle 206 based on the average rate of speed of the bicyclist.

Figure 4A:
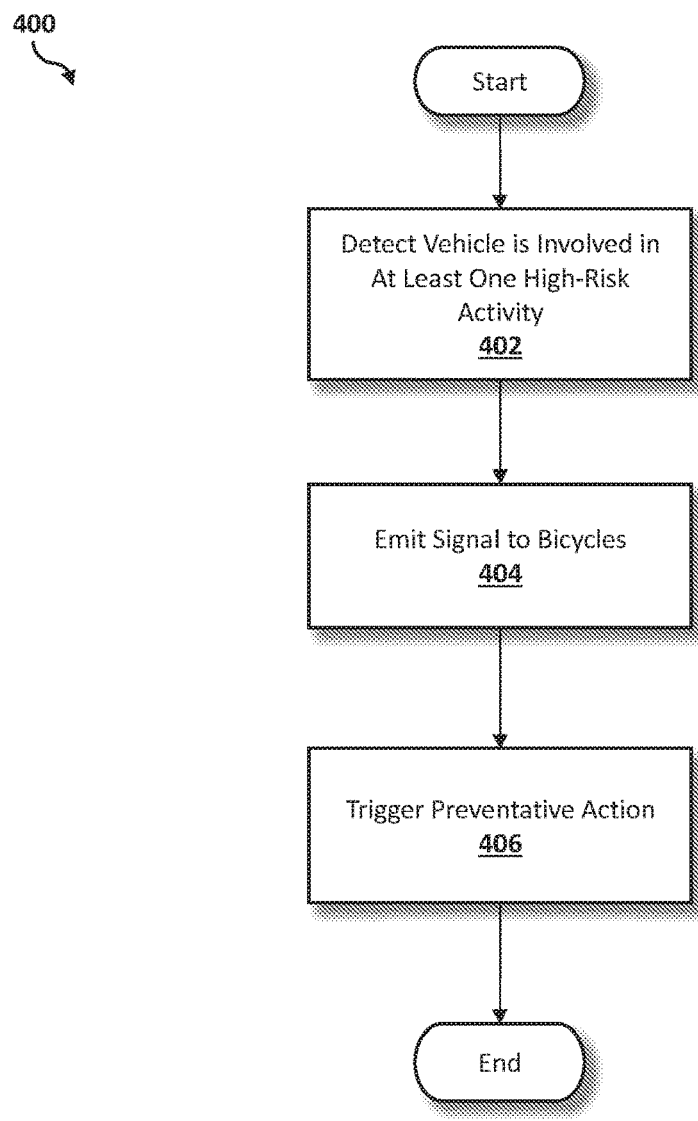
FIG. 4A is an operational flowchart illustrating a process for vehicle initiated communication to at least one bicycle according to at least one embodiment.

Referring now to FIG. 4A, an operational flowchart illustrating the exemplary vehicle initiated communication process to at least one bicycle 400 used by the bicycle-vehicle communication program 110a and 110b according to at least one embodiment is depicted.

At 402, the bicycle-vehicle communication program 110a, 110b detects a vehicle 206 is involved in at least one high-risk activity. Using the software program 108 on the user's device (e.g., user's computer 102), the bicycle-vehicle communication program 110a, 110b may determine that the vehicle 206 associated with the vehicle device 208 is involved in at least one high-risk activity by the vehicle device 208 communicating with the vehicle 206 and reading the sensor output of the vehicle 206. Such event may be transmitted as input into the bicycle-vehicle communication program 110a, 110b via the communication network 116.

For example, the bicycle-vehicle communication program 110a, 110b detects that Vehicles Y, X and W have just parked approximately 45 meters away, 65 meters away and 70 meters away, respectively, from Bicycle C and within the direct path of Bicycle C.

Next at 404, the vehicle 206 involved in at least one high-risk activity emits a signal to at least one bicycle 202. Using the software program 108 on the user's device (e.g., user's computer 102), the vehicle device 208 associated with the recently parked vehicle 206 or vehicle 206 with an open door may transmit as input into a bicycle device 204 associated with the bicycle-vehicle communication program 110a, 110b via the communication network 116. As such, bicycle devices 204 which the vehicle device 208 is within the direct path of may be notified that the vehicle 206 is involved in at least one high-risk activity.

Continuing the previous example, the devices associated with Vehicles Y, X and W (i.e., Vehicle Device Y, Vehicle Device X and Vehicle Device W, respectively) emit signals to the device associated with Bicycle C (i.e., Bicycle Device C) notifying the bicyclist on Bicycle C (i.e., Bicyclist C) that Vehicles X, Y and W have recently parked approximately 45 meters away, 65 meters away and 70 meters away on the right side of Bicycle C.

Then, at 406, the bicycle-vehicle communication program 110a, 110b triggers at least one preventative action. Once the bicycle-vehicle communication program 110a, 110b confirms that the vehicle 206 associated with a specific vehicle device 208 has parked or has an open door, then the bicycle-vehicle communication program 110a, 110b may trigger at least one preventative action (e.g., turning on an alert internal light, playing a loud noise, or momentarily blocking the doors located at the side of the mirror). Such preventative action may notify the occupants of the vehicle 206 that a bicycle 202 is approaching and may prevent the occupants of the vehicle 206 from opening the doors without confirming that the bicycle 202 is not approaching, thereby reducing vehicle open door accidents involving bicycles 202.

Continuing the previous example, based on the previously determined settings of the individual vehicles, specific preventative action triggers were activated in Vehicles X, Y and W. The internal lights of Vehicle X blinked to notify the occupants that Bicycle C is approaching. In Vehicle Y, a loud alarm sound played to notify the occupants that Bicycle C was approaching. In Vehicle W, the door locks opened and closed rapidly three times to indicate Bicycle C was approaching.

In the present embodiment, the bicycle-vehicle communication program 110a, 110b may be adjusted to automatically determine the probability of a door being opened based on multiple variables, such as parked timing (e.g., how long the vehicle 206 has been parked, whether the parking meter is about to expire), type of vehicle 206 (e.g., personal, taxi, delivery truck), location (e.g., near loading and unloading dock, or near at least one vehicle occupants' place to employment), and date and time (e.g., during rush hour on a weekday). As such, the bicyclist may be notified when there is a strong probability that a door of the vehicle 206 may be opened as well as when a vehicle 206 has at least one open door.

Figure 4B:
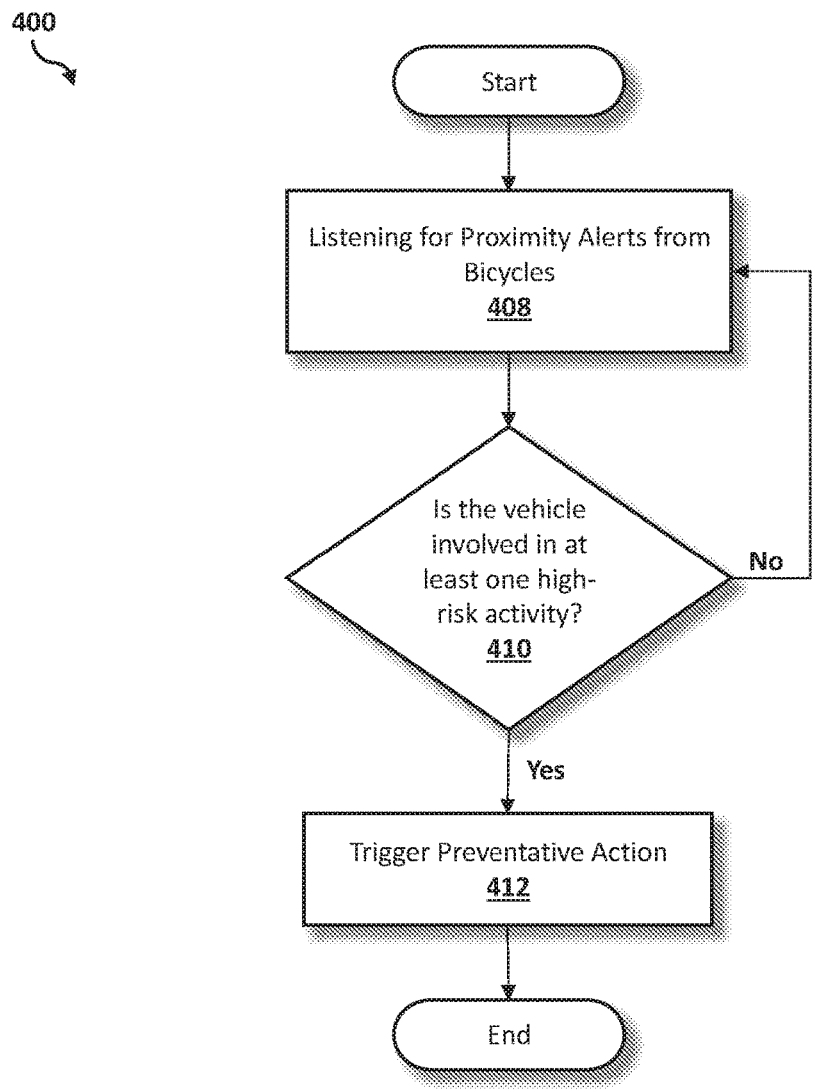
FIG. 4B is an operational flowchart illustrating a process for vehicle initiated communication due to at least one proximity alert from at least one bicycle according to at least one embodiment.

Referring now to FIG. 4B, an operational flowchart illustrating the exemplary vehicle initiated communication due to at least one proximity alert from at least one bicycle process 400 used by the bicycle-vehicle communication program 110a and 110b according to at least one embodiment is depicted.

At 408, a vehicle device 208 associated with a vehicle 206 listens for proximity alerts from bicycles 202. Using a software program 108 on the user's device (e.g., user's computer 102), the proximity alerts from at least one bicycle device 204 may be transmitted as input into at least one vehicle device 208 associated with the bicycle-vehicle communication program 110a, 110b via a communication network 116. The vehicle device 208 associated with the bicycle-vehicle communication program 110a, 110b may be continuously listening for such proximity alerts.

For example, the device associated with Vehicle V (i.e., Vehicle Device V) continues to listen for proximity alerts that a bicycle 202 is approaching. If the engine for Vehicle V is off (i.e., the vehicle 206 is in an inactive state) for more than a predetermined period of time, such as 30 minutes, then Vehicle Device V is in sleep mode and the proximity alerts of an approaching bicycle 202 will cease until the engine for Vehicle V is turned on (i.e., vehicle 206 is in an active state), or the sensors connected to the vehicle 206 detect that a door has unlatched or opened, at which time Vehicle Device V resumes listening for proximity alerts.

Then, at 410, the vehicle device 208 determines whether the vehicle 206 is involved in at least one high-risk activity. Utilizing the sensors connected to the vehicle 206 that interact with the vehicle device 208, the vehicle device 208 may determine whether the vehicle 206 is parked or has at least one open door. If the vehicle 206 is parked, then the sensors of the vehicle 206 may indicate that the vehicle 206 is not in motion and the engine is turned off. If at least one door is opened on the vehicle, then the sensors connected to the vehicle 206 may indicate that at least one door latch is opened.

If the bicycle-vehicle communication program 110a, 110b determines that the vehicle 206 is not parked or has no door open at 410, then the vehicle device 208 may return to 408 and may continue to listen for proximity alerts from bicycles 202. Until the vehicle device 208 associated with the bicycle-vehicle communication program 110a, 110b senses that the vehicle 206 parks or opens the door, the vehicle device 208 may continuously listen for such proximity alerts. The proximity alerts may present little or no effect to the vehicle 206 or occupants of the vehicle 206 until the vehicle 206 is parked, about to open the door, or has an open door.

Continuing the previous example, if Vehicle V is driving with no open doors, then the proximity alert that Bicycle D is approaching Vehicle V has little to no effect on Vehicle V, and Vehicle V will continue to listen for proximity alerts until Vehicle V is parked, about to open at least one door, or has at least one opened door.

If, however, the bicycle-vehicle communication program 110a, 110b determines that the vehicle 206 is parked or at least one door opened at 410, then the bicycle-vehicle communication program 110a, 110b may trigger at least one preventative action at 412. Once the bicycle-vehicle communication program 110a, 110b confirms that the vehicle 206 associated with a specific vehicle device 208 has parked or has an open door, then the bicycle-vehicle communication program 110a, 110b may trigger at least one preventative action (e.g., turning on an alert internal light, playing a loud noise, or momentarily blocking the doors located at the side of the mirror). Such preventative action may notify the occupants of the vehicle 206 that a bicycle 202 is approaching and may prevent the occupants of the vehicle 206 from opening the doors without confirming that the bicycle 202 is not approaching, thereby reducing vehicle open door accidents involving bicycles 202.

Continuing the previous example, the bicycle-vehicle communication program 110a, 110b determined that Vehicle V has just parked within the direct path of Bicycles E, D and F, which are approximately 50 meters away. The bicycle-vehicle communication program 110a, 110b then triggers the preventative action in Vehicle V, which is for an automated voice to announce that three bicycles 202 are approaching and are approximately 50 meters away from Vehicle V travelling at an average speed of 15 miles per hour, further prompting the occupants to exercise caution when exiting Vehicle V.

It may be appreciated that FIGS. 2A, 2B, 3A, 3B, 4A and 4B provide only an illustration of one embodiment and do not imply any limitations with regard to how different embodiments may be implemented. Many modifications to the depicted embodiment(s) may be made based on design and implementation requirements.

Figure 5:
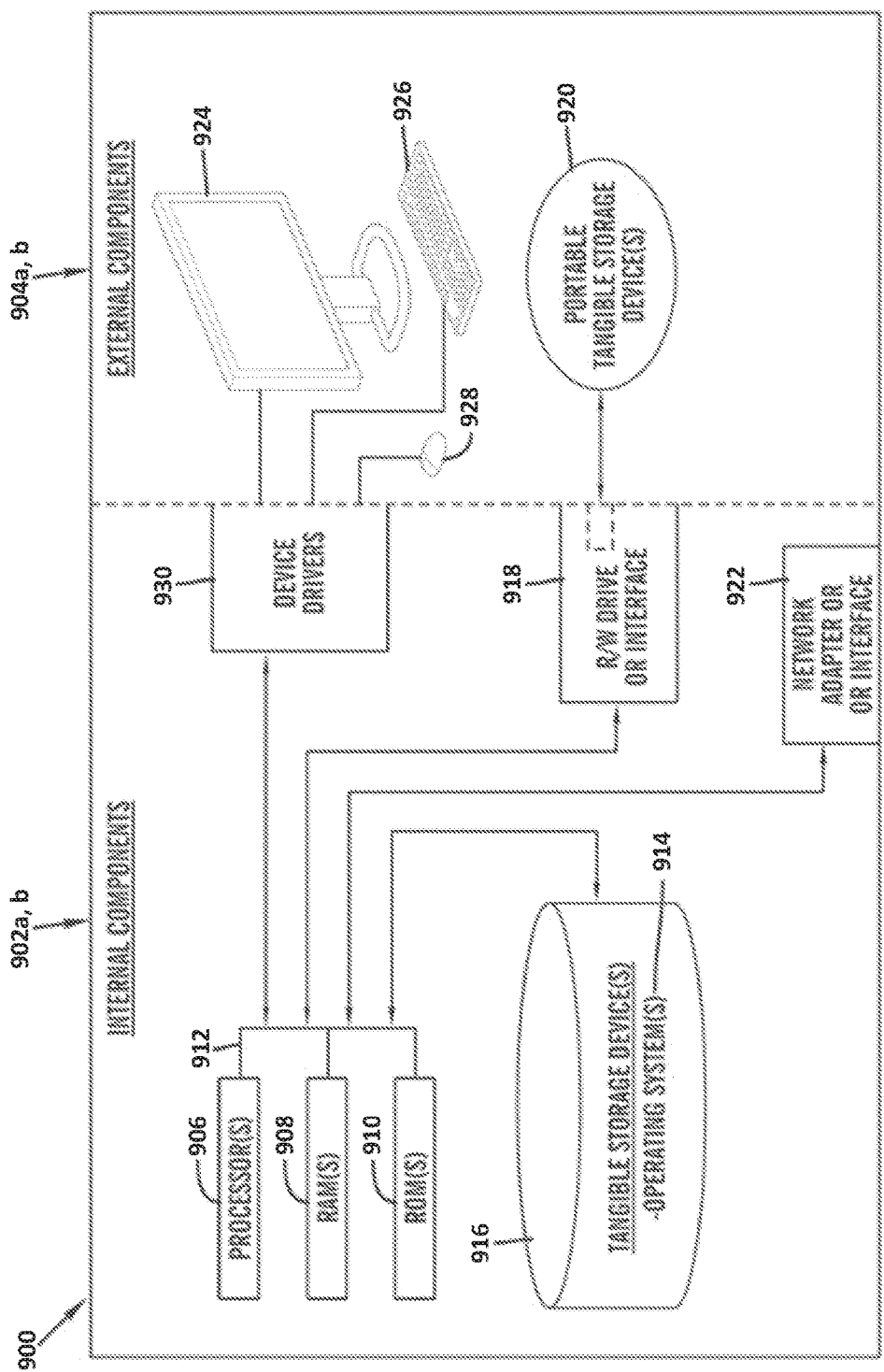
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the bicycle-vehicle communication program 110a in client computer 102, and the bicycle-vehicle communication program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the bicycle-vehicle communication program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the bicycle-vehicle communication program 110a in client computer 102 and the bicycle-vehicle communication program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the bicycle-vehicle communication program 110a in client computer 102 and the bicycle-vehicle communication program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
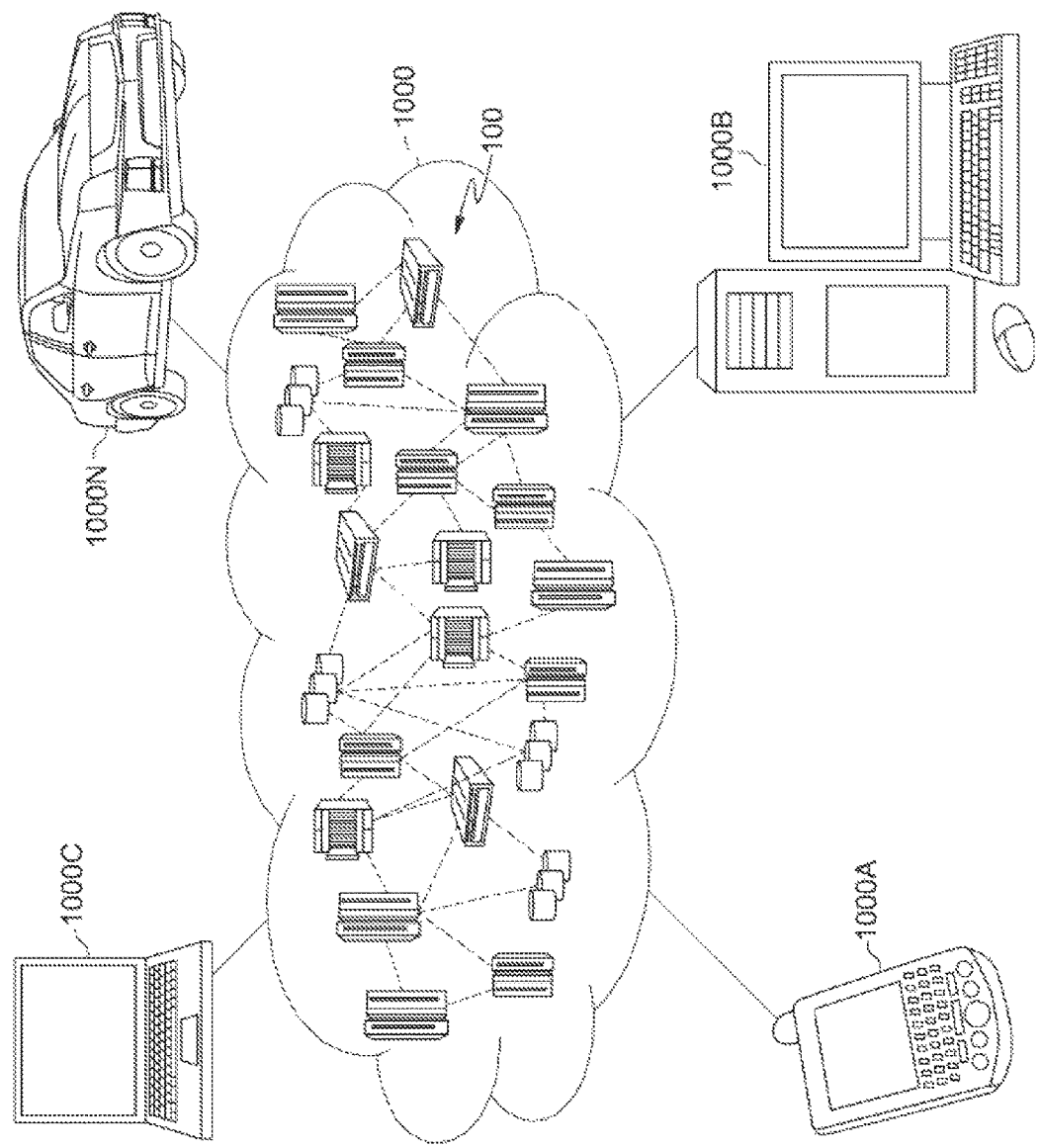
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
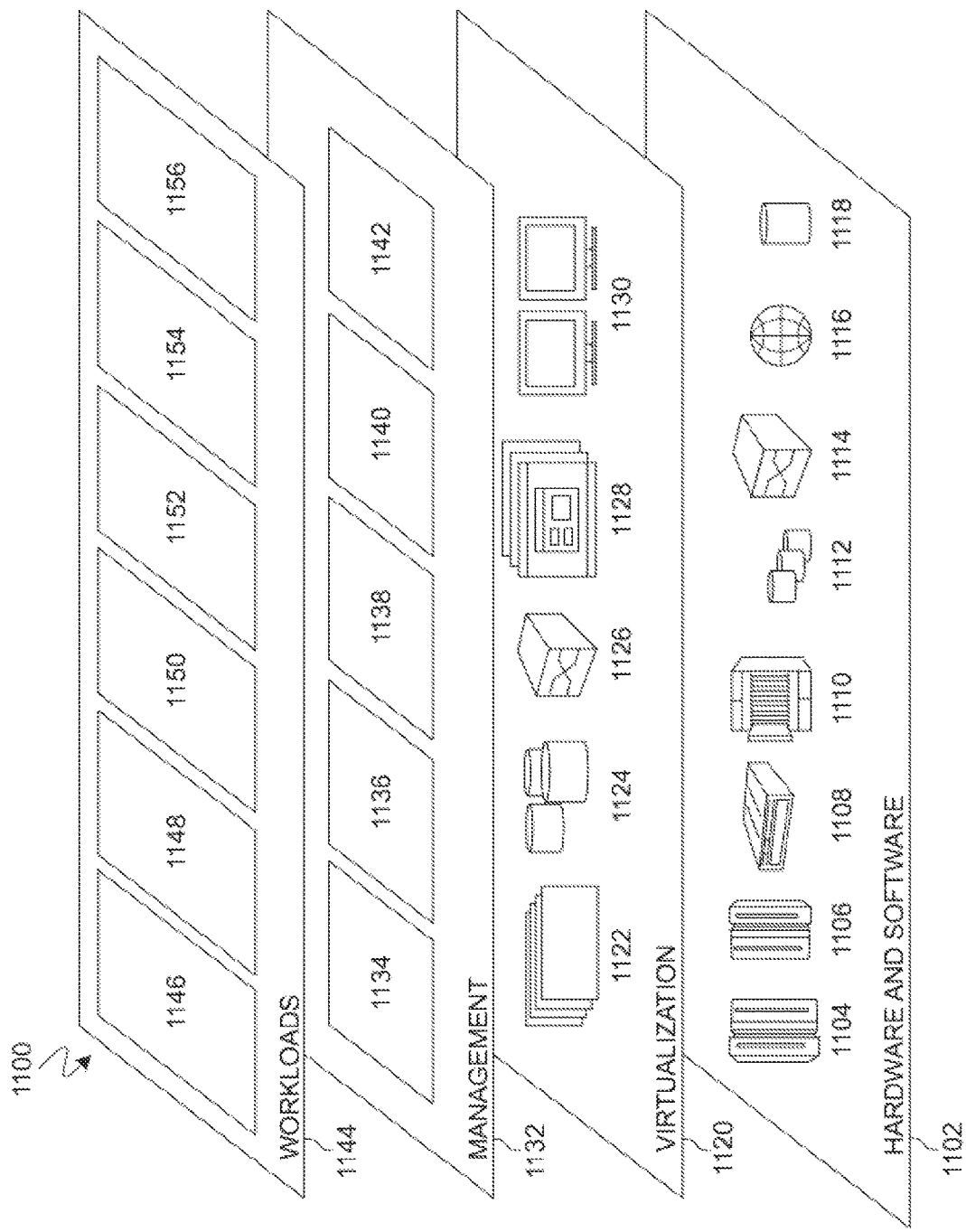
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and bicycle-vehicle communication 1156. A bicycle-vehicle communication program 110*a*, 110*b* provides a way to communicate between bicycles and vehicles to avoid open vehicle door accidents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    collecting data from a bicycle device associated with the bicycle, wherein collecting the data comprises:
        determining, by the bicycle device, the bicycle is in a stationary state;
        sending, by the bicycle device, a request to a user to confirm that the bicycle is in the stationary state; and
        receiving, from the user, a response to the sent request, wherein the user confirms that the bicycle is in an active state;
    determining a vehicle is involved in at least one high-risk activity;
    determining the bicycle is in a proximity of the vehicle involved in the at least one high-risk activity; and transmitting, by the bicycle device, a plurality of proximity alerts to the vehicle involved in the at least one high-risk activity while the bicycle is in the active state.

2. The method of claim 1, further comprises:
transmitting and receiving a plurality of alert signals and the plurality of proximity alerts, wherein the plurality of alert signals are transmitted, by a vehicle device associated with the vehicle, to the bicycle device that the vehicle is involved in the at least one high-risk activity, wherein the bicycle device stops receiving the plurality of alert signals when not in the active state.

3. The method of claim 1, wherein collecting the data from the bicycle device associated with the bicycle, further comprises:
determining, by the bicycle device, the bicycle is in motion; and
determining, by the bicycle device, at least one route for the bicycle, wherein at least one electronic device associated with the bicycle device is utilized to generate the at least one route for the bicycle.

4. The method of claim 1, wherein collecting data from a bicycle device associated with the bicycle, further comprises:
determining, by the bicycle device, the bicycle device was removed from the bicycle; and
ending the transmitted plurality of alert signals to the bicycle based on determining the bicycle device was removed.

5. The method of claim 2, further comprising:
responding, by the vehicle device, to the transmitted plurality of proximity alerts from the bicycle device by triggering at least one preventative action in the vehicle involved in the at least one high-risk activity.

6. The method of claim 2, further comprises:
determining, by the vehicle device, the vehicle is in an inactive state for a predetermined period of time; and
ending, by the vehicle device, the transmitted plurality of proximity alerts to the bicycle device.

7. The method of claim 6, further comprising:
determining, by the vehicle device, the vehicle is in an active state, wherein an engine associated with the vehicle is turned on; and
receiving, by the vehicle device, the transmitted plurality of proximity alerts from at least one bicycle device.

8. A computer system for communicating between a bicycle and a vehicle to prevent vehicle open door accidents, comprising:
one or more processors, one or more computer-readable memories, one or more computer-readable non-transitory storage media, and program instructions stored on at least one of the one or more computer-readable non-transitory storage media for execution by at least one of the one or more processors via at least one of the one or more memories, wherein the computer system is capable of performing a method comprising:
collecting data from a bicycle device associated with the bicycle, wherein collecting the data comprises:
determining, by the bicycle device, the bicycle is in a stationary state;
sending, by the bicycle device, a request to a user to confirm that the bicycle is in the stationary state; and
receiving, from the user, a response to the sent request, wherein the user confirms that the bicycle is in an active state;
determining the vehicle is involved in at least one high-risk activity;

determining the bicycle is in a proximity of the vehicle involved in the at least one high-risk activity; and
transmitting, by the bicycle device, a plurality of proximity alerts to the vehicle involved in the at least one high-risk activity while the bicycle is in the active state.

9. The computer system of claim 8, further comprises:
transmitting and receiving a plurality of alert signals and the plurality of proximity alerts, wherein the plurality of alert signals are transmitted, by a vehicle device associated with the vehicle, to the bicycle device that the vehicle is involved in the at least one high-risk activity, wherein the bicycle device stops receiving the plurality of alert signals when not in the active state.

10. The computer system of claim 8, wherein collecting the data from the bicycle device associated with the bicycle, further comprises:
determining, by the bicycle device, the bicycle is in motion; and
determining, by the bicycle device, at least one route for the bicycle, wherein at least one electronic device associated with the bicycle device is utilized to generate the at least one route for the bicycle.

11. The computer system of claim 8, wherein collecting data from a bicycle device associated with the bicycle, further comprises:
determining, by the bicycle device, the bicycle device was removed from the bicycle; and
ending the transmitted plurality of alert signals to the bicycle based on determining the bicycle device was removed.

12. The computer system of claim 9, further comprising:
responding, by the vehicle device, to the transmitted plurality of proximity alerts from the bicycle device by triggering at least one preventative action in the vehicle involved in the at least one high-risk activity.

13. The computer system of claim 9, further comprises:
determining, by the vehicle device, the vehicle is in an inactive state for a predetermined period of time; and
ending, by the vehicle device, the transmitted plurality of proximity alerts to the bicycle device.

14. The computer system of claim 13, further comprising:
determining, by the vehicle device, the vehicle is in an active state, wherein an engine associated with the vehicle is turned on; and
receiving, by the vehicle device, the transmitted plurality of proximity alerts from at least one bicycle device.

15. A computer program product for communicating between a bicycle and a vehicle to prevent vehicle open door accidents, the computer program product comprising a non-transitory computer readable medium having program instructions embodied therewith, the program instructions executable by processor to:
collecting data from a bicycle device associated with the bicycle, wherein collecting the data comprises:
determining, by the bicycle device, the bicycle is in a stationary state;
sending, by the bicycle device, a request to a user to confirm that the bicycle is in the stationary state; and
receiving, from the user, a response to the sent request, wherein the user confirms that the bicycle is in an active state;
determining that the vehicle is involved in at least one high-risk activity;
determining that the bicycle is in a proximity of the vehicle involved in the at least one high-risk activity; and transmitting, by the bicycle device, a plurality of proximity alerts to the vehicle involved in the at least one high-risk activity while the bicycle is in the active state.

16. The computer program product of claim 15, further comprises:
   transmitting and receiving a plurality of alert signals and the plurality of proximity alerts, wherein the plurality of alert signals are transmitted, by a vehicle device associated with the vehicle, to the bicycle device that the vehicle is involved in the at least one high-risk activity, wherein the bicycle device stops receiving the plurality of alert signals when not in the active state.

17. The computer program product of claim 15, wherein collecting the data from the bicycle device associated with the bicycle, further comprises:
   determining, by the bicycle device, the bicycle is in motion; and
   determining, by the bicycle device, at least one route for the bicycle, wherein at least one electronic device associated with the bicycle device is utilized to generate the at least one route for the bicycle.

18. The computer program product of claim 15, wherein collecting data from a bicycle device associated with the bicycle, further comprises:
   determining, by the bicycle device, the bicycle device was removed from the bicycle; and
   ending the transmitted plurality of alert signals to the bicycle based on determining the bicycle device was removed.

19. The computer program product of claim 16, further comprising:
   responding, by the vehicle device, to the transmitted plurality of proximity alerts from the bicycle device by triggering at least one preventative action in the vehicle involved in the at least one high-risk activity.

20. The computer program product of claim 16, further comprises:
   determining, by the vehicle device, the vehicle is in an inactive state for a predetermined period of time; and
   ending, by the vehicle device, the transmitted plurality of proximity alerts to the bicycle device.

* * * * *